United States Patent
Sugimoto et al.

(10) Patent No.: US 6,821,178 B2
(45) Date of Patent: Nov. 23, 2004

(54) METHOD OF PRODUCING BARRIER RIBS FOR PLASMA DISPLAY PANEL SUBSTRATES

(75) Inventors: Takaki Sugimoto, Komae (JP); Chikafumi Yokoyama, Zama (JP); Akira Yoda, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 10/258,684

(22) PCT Filed: Jun. 6, 2001

(86) PCT No.: PCT/US01/18209

§ 371 (c)(1),
(2), (4) Date: Oct. 25, 2002

(87) PCT Pub. No.: WO01/95361

PCT Pub. Date: Dec. 13, 2001

(65) Prior Publication Data

US 2003/0224688 A1 Dec. 4, 2003

(30) Foreign Application Priority Data

Jun. 8, 2000 (JP) .................................. 2000-177174

(51) Int. Cl.[7] .................................................. H01J 9/00
(52) U.S. Cl. .......................................... 445/24; 445/25
(58) Field of Search .................... 445/24, 25; 313/582, 313/587, 292

(56) References Cited

U.S. PATENT DOCUMENTS

| | | |
|---|---|---|
| 4,026,714 A | 5/1977 | Lewis |
| 4,536,435 A | 8/1985 | Utsumi et al. |
| 4,554,259 A | 11/1985 | Franklin et al. |
| 4,617,279 A | 10/1986 | Manabe et al. |
| 4,640,900 A | 2/1987 | Kokubu et al. |
| 4,857,420 A | 8/1989 | Maricle et al. |
| 4,867,935 A | 9/1989 | Morrison, Jr. |
| 4,975,104 A | 12/1990 | Kim |
| 5,004,950 A | 4/1991 | Lee |

(List continued on next page.)

FOREIGN PATENT DOCUMENTS

| | | | |
|---|---|---|---|
| EP | 0 802 170 A2 A3 | 10/1997 | |
| EP | 0 836 892 A2 | 4/1998 | |
| EP | 0 855 731 A1 | 7/1998 | |
| EP | 0 866 487 | 9/1998 | |
| EP | 875915 A2 * | 11/1998 | ............. H01J/9/20 |

(List continued on next page.)

OTHER PUBLICATIONS

Ciba Specialty Chemicals, "Irgacure® 819" p 1–3, last edit: Mar. 4, 1997 by Business Product Management BU–ICA, Basle.

*Primary Examiner*—Ashok Patel
*Assistant Examiner*—Mariceli Santiago
(74) *Attorney, Agent, or Firm*—Carolyn A. Fischer

(57) ABSTRACT

A method of producing barrier ribs for a plasma display panel substrate, which comprises the steps of: (a) partially filling a groove portion of a mold with a first photosensitive glass-ceramic paste selected from a photosensitive black glass-ceramic paste and a photosensitive white glass-ceramic paste, and curing the paste by irradiating with radiation; (b) supplying a second photosensitive glass-ceramic paste, which is different from the first photosensitive glass-ceramic paste, selected from the photosensitive black glass-ceramic paste and the photosensitive white glass-ceramic paste, on a glass base, and laminating the mold with the glass base through the second paste to form a laminate; (c) irradiating the laminate with radiation to form a rib precursor molded article composed of two white and black layers; (d) removing the mold from the glass base and the rib precursor molded article to transfer the rib precursor molded article to the glass base; and (e) sintering the rib precursor molded article to form a rib formed integrally on the glass base.

10 Claims, 2 Drawing Sheets

U.S. PATENT DOCUMENTS

| | | |
|---|---|---|
| 5,011,391 A | 4/1991 | Kawasaki et al. |
| 5,037,723 A | 8/1991 | Hwang |
| 5,116,704 A | 5/1992 | Kwon |
| 5,136,207 A | 8/1992 | Miyake et al. |
| 5,205,770 A | 4/1993 | Lowrey et al. |
| 5,209,688 A | 5/1993 | Nishigaki et al. |
| 5,247,227 A | 9/1993 | Park |
| 5,268,233 A | 12/1993 | Heller et al. |
| 5,342,563 A | 8/1994 | Quinn et al. |
| 5,352,478 A | 10/1994 | Miyake et al. |
| 5,484,314 A | 1/1996 | Farnworth |
| 5,509,840 A | 4/1996 | Huang et al. |
| 5,527,624 A | 6/1996 | Higgins et al. |
| 5,581,876 A | 12/1996 | Prabhu et al. |
| 5,585,428 A | 12/1996 | Quinn et al. |
| 5,601,468 A | 2/1997 | Fujii et al. |
| 5,629,583 A | 5/1997 | Jones et al. |
| 5,658,832 A | 8/1997 | Bernhardt et al. |
| 5,667,418 A | 9/1997 | Fahlen et al. |
| 5,672,460 A | 9/1997 | Katoh et al. |
| 5,703,433 A | 12/1997 | Fujii et al. |
| 5,707,267 A | 1/1998 | Hayashi |
| 5,714,840 A | 2/1998 | Tanabe et al. |
| 5,725,407 A | 3/1998 | Liu et al. |
| 5,747,931 A | 5/1998 | Riddle et al. |
| 5,776,545 A | 7/1998 | Yoshiba et al. |
| 5,840,465 A | 11/1998 | Kakinuma et al. |
| 5,853,446 A | 12/1998 | Carre et al. |
| 5,854,152 A | 12/1998 | Kohli et al. |
| 5,854,153 A | 12/1998 | Kohli |
| 6,039,619 A * | 3/2000 | Kang et al. .................. 445/24 |
| 6,247,986 B1 | 6/2001 | Chiu et al. |
| 6,306,948 B1 | 10/2001 | Yokoyama et al. |
| 6,352,763 B1 | 3/2002 | Dillon et al. |

FOREIGN PATENT DOCUMENTS

| | | | | |
|---|---|---|---|---|
| FR | 2 764 438 | 11/1998 | | |
| JP | 1-137534 | 5/1989 | | |
| JP | 3-54569 | 3/1991 | | |
| JP | 6-293191 | 10/1994 | | |
| JP | 8-119725 | 5/1996 | | |
| JP | 8-273537 | 10/1996 | | |
| JP | 08273538 A * | 10/1996 | ............. | H01J/9/02 |
| JP | 8-301631 | 11/1996 | | |
| JP | 8-321258 | 12/1996 | | |
| JP | 9-12336 | 1/1997 | | |
| JP | 9-134676 | 5/1997 | | |
| JP | 10-134705 | 5/1997 | | |
| JP | 9-147754 | 6/1997 | | |
| JP | 9-245629 | 9/1997 | | |
| JP | 9-259754 | 10/1997 | | |
| JP | 9-265905 | 10/1997 | | |
| JP | 10-172442 | 6/1998 | | |
| JP | 10-321143 | 12/1998 | | |
| JP | 10-326571 | 12/1998 | | |
| JP | 11-135025 | 5/1999 | | |
| JP | 11-339668 | 12/1999 | | |
| JP | 2000-21303 | 1/2000 | | |
| WO | WO 97/22961 | 6/1997 | | |

* cited by examiner

METHOD OF PRODUCING BARRIER RIBS FOR PLASMA DISPLAY PANEL SUBSTRATES

TECHNICAL FIELD

The present invention relates to a method of producing a plasma display panel ("PDP") substrate and, more particularly, to a method of producing barrier ribs for PDP substrate, capable of providing an image having high brightness and high contrast.

BACKGROUND

Various developments have recently been made in the field of flat panel display devices capable of displaying large images. Among them are PDPs. Generally, a PDP is equipped with a substrate composed of a pair of glass flat panels (glass bases) facing each other and separated by a distance via barrier ribs each having a predetermined dimension (also referred to as a rib, bulkhead or barrier). In PDP substrates with such constructions, the space between the glass panels is partitioned in an air-tight manner to form a plurality of discharge display cells capable of containing an inert gas such as neon, helium or xenone as a discharge gas.

Technical problems of PDP include displaying images having high brightness and high contrast. Typically, the ribs on the back panel are white, causing light emitted from a fluorescent material due to discharge of the above-described rare gas to be reflected. This can be effective in increasing brightness. However, reflection of external light on the rib tops can greatly reduce contrast.

As a measure for simultaneously satisfying both requirements of high brightness and high contrast, Unexamined Patent Publication (Kokai) No. 10-321143 has suggested a structure wherein colored patterns for respective luminescent colors are formed on a front panel at the positions corresponding to the luminescent colors, and black strips are provided at the positions on the front panel contacting the rib tops as a boundary of the colored patterns. Drawbacks of this approach include many complicated processing steps, high size and position accuracy requirements, and the like.

Unexamined Patent Publication (Kokai) No. 10-172442 discloses a PDP substrate comprising a glass base and ribs formed on the glass base, wherein the rib tops are black and the rib bottoms are white or transparent. This inhibits external light reflection from the rib tops for increased contrast while allowing some reflection of emitted light by the bottom rib portions. According to the above publication, screen printing and photolithography are employed to form a bulkhead for such a PDP substrate. These methods have drawbacks such as requiring time consuming drying steps before coating each next layer. Using screen printing methods, it is difficult to maintain size and shape accuracy. Photolithograpy methods require several developing, coating and exposure steps.

SUMMARY OF THE INVENTION

Figure 1A:
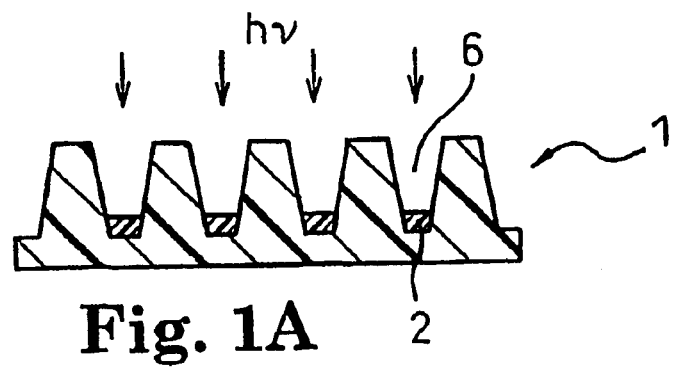
FIG. 1 is a flow chart showing steps of producing ribs for a PDP substrate according to the present invention.

The present invention provides a method of forming PDP barrier ribs having an effective structure to realize a PDP having high brightness and high contrast on a glass base in a manner which is more simple and accurate than conventional methods.

According to the present invention, barrier ribs for a PDP substrate that promote high brightness and high contrast can be produced in a short time, with the size and shape of the resulting ribs having high accuracy. In the production process of the PDP substrate, a complicated operation such as positioning of a rib white portion and a rib black portion is not required.

According to the present invention, there is provided a method of producing a rib for a plasma display panel substrate, which comprises the steps of:

(a) partially filling a groove portion of a mold with a first photosensitive glass-ceramic paste selected from a photosensitive black glass-ceramic paste and a photosensitive white glass-ceramic paste, and curing the paste by irradiating with radiation;

(b) supplying a second photosensitive glass-ceramic paste, which is different from the first photosensitive glass-ceramic paste, selected from the photosensitive black glass-ceramic paste and the photosensitive white glass-ceramic paste, on a glass base, and laminating the mold with the glass base through the second paste to form a laminate;

(c) irradiating the laminate with radiation to form a rib precursor molded article composed of two white and black layers;

(d) removing the mold from the glass base and the rib precursor molded article to transfer the rib precursor molded article to the glass base; and (e) sintering the rib precursor molded article to form a rib formed integrally on the glass base.

Methods of the present invention do not require any drying steps and can be carried out in a production process within a very short time because the first paste with which the mold was filled can be solidified by curing. Since the ribs are formed by first partially filling the groove portion of the mold with the first photosensitive paste and then filling the same mold with the second paste, the accuracy of the size and shape of the rib is as high as when forming ribs with a mold using a simple paste. Furthermore, the methods of the present invention do not require the positioning steps required in the prior art, since the white and black portions of the ribs are molded together. Therefore, ribs for PDP substrates that provide high brightness and high contrast can be obtained in a simple and accurate manner.

In the present specification, the glass flat plate at the display surface side of the PDP substrate is referred to as a "front panel", while the glass panel at the opposite side is referred to as a "back panel". Furthermore, the front panel and back panel are generically referred to as a "base" or a "glass base".

DETAILED DESCRIPTION

The present invention will be described by way of the following embodiments but is not limited thereto, as is apparent to a person with ordinary skill.

According to the present invention, barrier ribs can be formed by sintering a rib precursor molded article obtained by curing a photosensitive glass-ceramic paste capable of curing by radiation (for example, ultraviolet light, electron beam or visible light). The rib precursor molded article is composed of two layers, e.g. a layer of a cured photosensitive black glass-ceramic paste and a layer of cured photosensitive white glass-ceramic paste. The black and white layered ribs obtained by sintering are integrally formed on one of bases of the back panel and front panel. When the ribs are integrally formed on the back panel, the ribs formed by the present invention are composed of a black layer as a top layer and a white layer as a bottom layer. When the ribs are integrally formed on the front panel, the ribs are composed of a white layer as a top layer and a black layer as a bottom layer. In either case, the PDP substrate includes ribs having a black layer at the display surface side and a white layer at the back panel side. With such a constitution, external light reflection at the display surface side is inhibited and absorption of light emitted from the fluorescent material on light emission due to the rib is inhibited, thus attaining high contrast and high brightness.

The photosensitive glass-ceramic paste basically contains a ceramic component, a glass component and a curable binder component. The ceramic component serves to afford a predetermined shape to the rib and is a powdered or granular inorganic oxide or a mixture thereof. The glass component is usually in a powdered or granular form, and basically serves to fill the space between the ceramic components thereby to afford a dense structure to the rib and to further enhance the strength of the rib. The black and white photosensitive glass-ceramic pastes are not specifically limited so long as they can form a rib composed of black and white layers after sintering. For example, black and white ceramic components or glass components are selected. Components having a white color include, but are not limited to, alumina, titania and low-melting glass fiber. Components having a black color include oxides of metals such as ruthenium (Ru), manganese (Mn), nickel (Ni), chromium (Cr), iron (Fe), cobalt (Co) and copper (Cu). Commercially available glass-ceramic components for forming the black paste include RFB-030 manufactured by Asahi Glass Co., Ltd., as a mixed powder of lead glass and ceramic (copper oxide and chromium oxide). Commercially available glass-ceramic components for forming the white paste include RFW-030 manufactured by Asahi Glass Co., Ltd., as a mixed powder of lead glass and ceramic (alumina and titania).

The glass component may be any glass suited for rib formation. Examples thereof include low-melting glass containing lead oxide as a principal component. However, such a glass generally has a large refractive index. Therefore, it is difficult to cure the photosensitive glass-ceramic paste by radiation. The glass component preferably has the same thermal expansion coefficient as that of a conventional glass base at the sintering temperature so as not to promote defects such as cracking, breakage and chap on sintering. Suitable glass components may comprise 70 to 95 wt % of phosphorous oxide ($P_2O_5$) and zinc oxide (ZnO), as a principal component, and further comprise 0.3 to 10 mol % of aluminum oxide ($Al_2O_3$), 0 to 5 mol % of barium oxide (BaO), 0 to 3 mol % of iron oxide ($Fe_2O_3$), 40 to 55 mol % of phosphorous oxide ($P_2O_5$), 0 to 5 mol % of silicon oxide ($SiO_2$), 30 to 55 mol % of zinc oxide (ZnO), 0 to 3 mol % of tin oxide (SnO), 0 to 5 mol % of calcium oxide (CaO), 0 to 5 mol % of magnesium oxide (MgO), 0 to 5 mol % of strontium oxide (SrO), 0 to 5 mol % of boron oxide ($B_2O_3$), and 0 to 5 mol % of sodium oxide ($Na_2O$). Suitable glass components may have a softening point of 450 to 570° C., which is lower than that of a soda-lime glass (which has an annealing point of 550° C.) and that of a high-distortion point glass (which has an annealing point of 620° C.). Further, the refractive index of the glass component is preferably no more than 1.6, for ease of radiation curing.

The ceramic component is usually an inorganic oxide or a mixture thereof, and suitable inorganic oxide components include, for example, aluminum oxide (alumina), silicon dioxide, titanium oxide (titania) and wollastonite. Such an inorganic oxide component can afford a high strength to the resulting rib because of its high hardness. In the production of the black paste, attention can be paid so that the paste is not excessively whitened by the process of certain inorganic oxides.

Preferred curable binder components for forming the photosensitive paste include bisphenol A diglycidyl ether (meth)acrylic acid adduct, Epolite 1600 acrylic acid adduct, Epolite 3002 acrylic acid adduct, ethylene glycol dimethacrylate, diethylene glycol dimethacrylate or triethylene glycol dimethacrylate, or a mixture thereof. These binder components are cured by irradiating with ultraviolet light, electron beams or visible light, for example, thereby making it possible to form a polymer compound having a network, and the ceramic component is uniformly contained and retained in the network. A curing initiator is usually used to cure the binder component. In cases where the binder component is made of a mixture of a bisphenol A diglycidyl ether methacrylic acid adduct and triethylene glycol dimethacrylate, it is possible to afford a sufficient strength to a rib precursor molded article after curing and to remove the resulting molded article without causing chap upon sintering.

In cases where the binder component is made of a silane coupling agent having a (meth)acrylic group, a network, which contains and retains the ceramic component, can be formed by silicon dioxide having a comparatively high melting point after sintering. Such a network is substantially maintained even when heated unless the temperature reaches the melting point of silicon dioxide. Accordingly, a change in volume of the rib does not occur substantially before or after sintering and the degree of the change is small. Preferred binder component of the silane coupling agent includes, for example, γ-methacryloxypropylmethyltrimethoxysilane, γ-methacryloxypropylmethyldimethoxysilane, γ-methacryloxypropyltriethoxysilane and γ-methacryloxypropylmethyldiethoxysilane in view of availability, each of which has a molecular weight of 232 to 290. In cases where the above-described composition contains the binder component of the silane coupling agent, mineral acids such as hydrochloric acid and nitric acid may be further contained, if necessary. The mineral acid contributes to hydrolysis of the silane coupling agent, thereby making it possible to convert this composition into a sol. The composition converted into the sol is not gelled by drying, thereby making it possible to disperse the ceramic component and glass component.

The binder component used in the present invention is not limited to those described above, and may be those which are not sensitive to radiations, such as cellulose-based polymer, polystyrene, butadiene-styrene copolymer, polyamide or polyether. Such a binder component is usually used in the state of being dissolved in a volatile solvent.

The binder component preferably has a burn-off temperature lower than the softening point of the glass component. In such case, it is possible to avoid incorporating a residual binder component in the rib after sintering by burning off the binder component at a temperature higher than the burn-off temperature of the binder component and lower than the softening temperature of the glass component, and then sintering the rib precursor molded article at a temperature no less than softening temperature of the glass component. Accordingly, gas evolution due to the residual binder component which is not preferred to plasma discharge can be inhibited.

It may be preferred to include an oxidizing catalyst in the photosensitive paste containing the above-described binder component. Such an oxidizing catalyst may be made of oxides, salts or complexes of chromium (Cr), manganese (Mn), iron (Fe), cobalt (Co), nickel (Ni), copper (Cu), zinc (Zn), indium (In), tin (Sn), ruthenium (Ru), rhodium (Rh), palladium (Pd), silver (Ag), iridium (Ir), platinum (Pt), gold (Au) or cerium (Ce), and can reduce the energy (temperature) required to burn-off of the binder component. As described above, to avoid residual binder material in the rib, the sintering temperature should be higher than the burn-off temperature of the binder component. Thus, due to the reduction of the burn-off temperature of the binder component, a temperature required for sintering is lowered. Such a reduction in sintering temperature can effectively inhibit thermal deformation (e.g. warpage, deflection or shrinkage) of the glass panel. Further, since a glass component having a relatively low softening point can be used, the selectivity of a glass component is wider. However, in the white paste, attention may be paid so that the paste is not excessively colored by the above oxidizing catalyst.

In cases where the composition for forming barrier ribs contains the above-described silane coupling agent as the binder component, mineral acids such as hydrochloric acid and nitric acid may be further contained. The mineral acid can convert the composition into a sol by hydrolysis of the silane coupling agent. The sol is not gelled even if this composition is dried, thereby making it possible to disperse the inorganic component composed of the ceramic component and glass component. The viscosity does not depend on the amount of water.

The glass base can be a base used generally in PDP substrates, and is preferably made of a commercially available soda-lime glass.

Production of the rib for PDP substrates will now be described in detail with reference to FIG. 1. FIG. 1 is a flow chart showing the steps of producing a PDP substrate according to the present invention. The embodiment wherein the glass base is a back panel will be described below, but the glass base can also be a front panel. In such a case, the following photosensitive black glass-ceramic paste is replaced by the photosensitive white glass-ceramic paste, while the photosensitive white glass-ceramic paste is replaced by the photosensitive black glass-ceramic paste.

First, as shown in FIG. 1(A), a mold 1 having a groove portion 6 corresponding to the shape of a rib of a PDP substrate is prepared. The mold 1 is preferably obtained by molding a curable component, for example, an acrylic monomer or oligomer such as urethane acrylate, polyester acrylate or polyether acrylate, or a monomer or oligomer of styrene, and radiation polymerizing in the presence of a curing initiator. The resulting mold 1 does not require cutting on production thereof. The above-described radiation polymerization proceeds comparatively quickly. Thus, the mold 1 can be easily obtained in a short time. The groove portion 6 of the mold 1 is partially filled with the photosensitive black glass-ceramic paste 2, and then the paste is cured by irradiation.

Figure 1B:
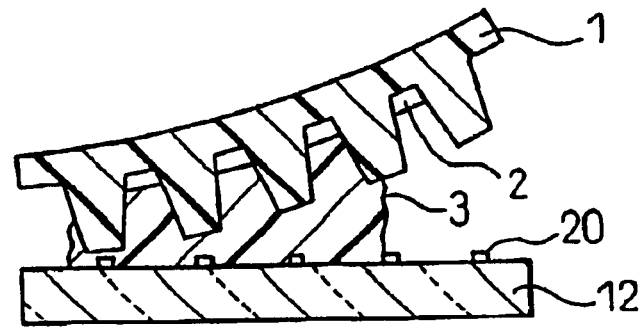

Subsequently, as shown in FIG. 1(B), the photosensitive white glass-ceramic paste is supplied on the back panel 12 on which an address electrode 20 has previously been formed in a stripe form, and then the mold 1 and back panel 12 are laminated with each other through the paste 3 after accurate positioning to form a laminate. In cases where the mold 1 is made of a curable component as described above, the pliability is imparted. In such case, as shown in FIG. 1(B), the mold 1 can be made contact with the paste 3 from one end of the back panel 12 by deflecting the mold 1. Accordingly, any air between the back panel 12 and paste 3 is efficiently removed and infiltration of the air into the paste 3 is also avoided. As shown in FIGS. 1(B) and (C), the protruding portions of the mold 1 and back panel 12 are preferably laminated at a fixed distance. Consequently, a dielectric layer is formed on the address electrode 20 and the address electrode 20 is coated, thereby making it possible to prolong lifetime of the PDP due to inhibition of sputtering of the address electrode 20.

Figure 1C:
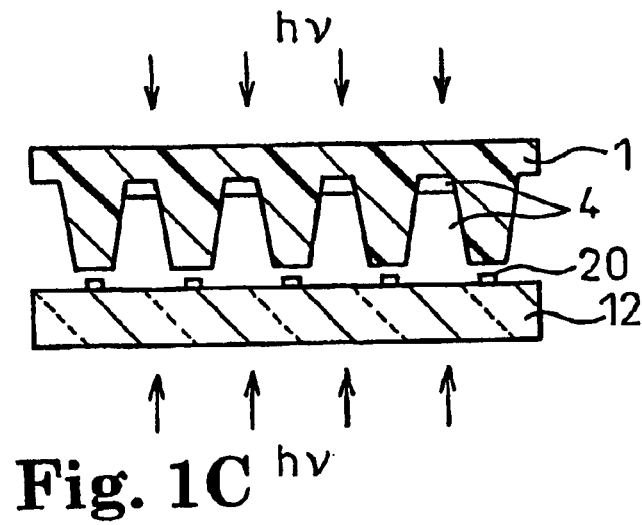

After the back panel 12 and the mold 1 containing a cured black paste 2 are laminated with each other through the white paste 3, the white paste 3 is irradiated with light (hv), thereby curing the binder component. As shown in FIG. 1(C), a rib precursor molded article 4 is obtained. In this case, curing is basically conducted only by radiation and does not require heat management, control of which may be difficult.

In cases where the mold 1 is made of the above-described curable component, it becomes transparent. Accordingly, irradiation can be conducted simultaneously through the mold 1 as well as the back panel 12. That is, irradiation with light can be conducted from both surfaces. In such a case, the black paste 2, which exists in the depths of the groove portion 6, is cured more certainly and the uncured binder component does not remain at the free end of the rib precursor molded article 4. Furthermore, substantially uniform mechanical strength is afforded to the rib precursor molded article 4.

Figure 1D:
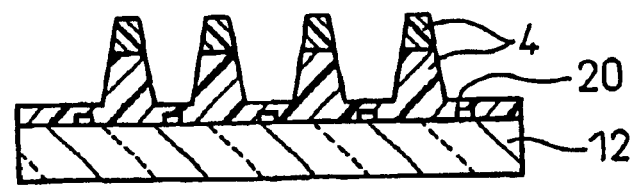

Subsequently, as shown in FIG. 1(D), the mold 1 is removed from the back panel 12 and rib precursor molded article 4 and the rib precursor molded article 4 is removed from the mold 1 while transferring the rib precursor molded article 4 integrally to the back panel 12. In cases where the mold 1 is made of the curable component as described above, the mold has a lower hardness than that of general glass or ceramic. When the mold 1 is removed from the base, breakage of the rib and base can be avoided. As a result, the mold 1 can be used repeatedly without being washed.

Next, both of the rib precursor molded article 4 and back panel 12 are put in a sintering oven (not shown) and sintered at 350 to 600° C. to obtain a back panel with a barrier rib pattern. Not shown in the drawing, the rib and back panel 12 are then cooled. At this time, if the back panel 12 and rib do not have substantially the same thermal expansion coefficient, the degree of shrinkage may not be the same and, therefore, defects such as cracks may be introduced into the rib 16, or the back panel 12 may bend. When the oxidizing catalyst is contained in the paste as described above, it becomes possible to sinter the molded article 4 at a comparatively low temperature.

A transparent front panel (not shown in the drawing), on which a bus electrode has previously been formed, can be disposed on the barrier ribs after fluorescent layers such as phosphors have been formed between ribs on the back panel. The peripheral portions of the front panel and back panel may be sealed in an air-tight manner by using a sealing material, thereby forming a discharge display cell between the front panel and back panel. After evacuating the discharge display cell, a discharge gas may be introduced into the discharge cell to make a PDP substrate.

The curing initiator of the above-described mold 1 is not specifically limited, but preferably has an absorption edge at a wavelength shorter than that of the curing initiator to be added in the binder component. In such a case, the curing initiator in the mold 1 should not absorb radiation having a wavelength longer than that of the absorption edge. Rather, the curing agent of the binder component should absorb such radiation. As a result, even if unreacted curing component remains in the mold 1, the irradiation of radiation having the above-described wavelength would not cause radiation polymerization simultaneously with the binder component, thereby avoiding close adhesion between the mold 1 and rib precursor molded article 4. Accordingly, removal of the mold can be easily conducted without causing breakage of the back panel 12 or rib precursor molded article 4 or its free end. The term "absorption edge" used in the present specification refers to a portion of wavelength wherein an absorbency in a continuous absorption spectrum of radiation rapidly decreases when the wavelength becomes longer than said wavelength, resulting in substantially transparent state.

The mold 1 may be subjected to antistatic finish to reduce the surface resistance and help prevent the sticking of charged dust particles. As a result, defects introduced into the ribs can be reduced, and it becomes unnecessary to store the mold 1 in a clean room to avoid dust contamination. It substantially becomes unnecessary to remove dusts from the mold before use of the mold 1. Handling of the mold becomes simple, which leads to an improvement in productivity. The antistatic finish of the mold 1 can be accomplished, for example, by dispersing a colorless medium of propylene carbonate, lactone or ethylene glycol or a derivative thereof, and an ionic conductive substance which can be ionized by dissolution into the mold material, such as lithium perchlorate.

Figure 2:
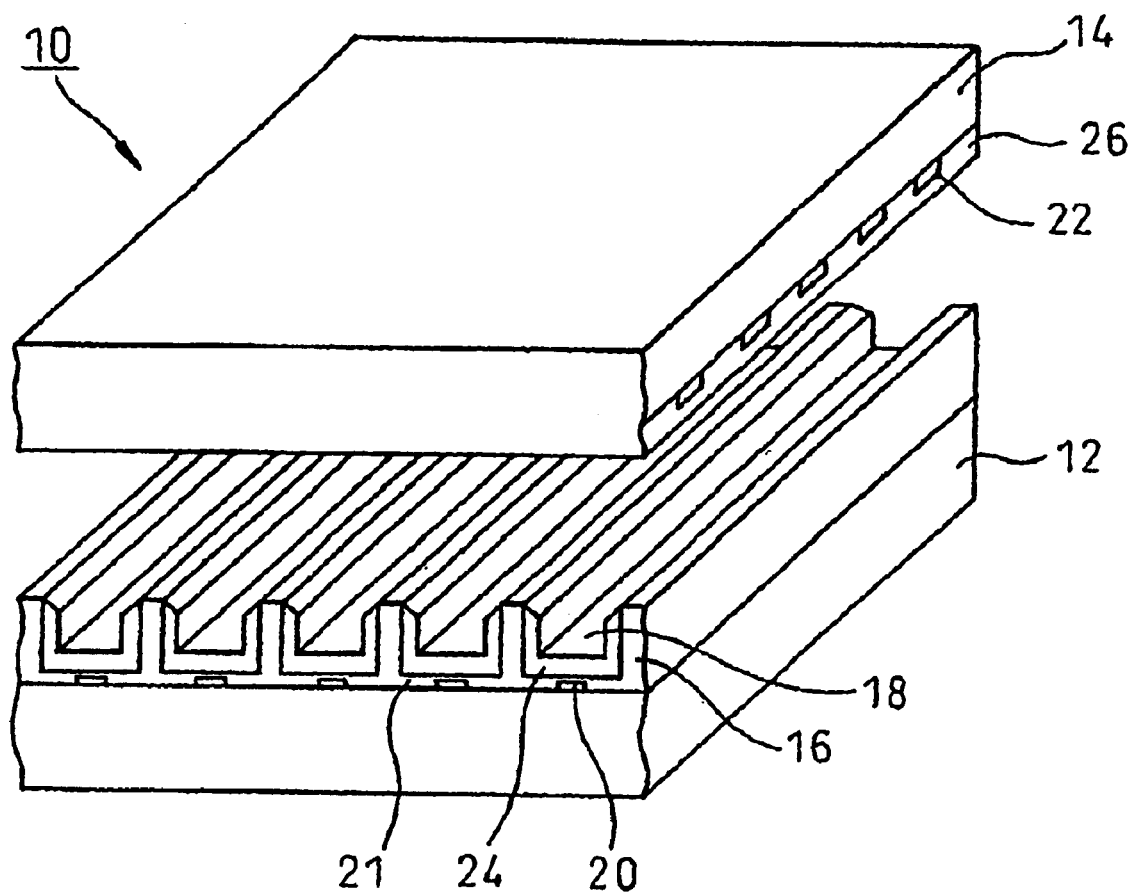
FIG. 2 is a partially exploded perspective view showing schematically one embodiment of a PDP substrate using barrier ribs made according to the present invention.

A partially exploded perspective view of FIG. 2 schematically shows one embodiment of the PDP substrate produced by using the ribs formed by the method according to the present invention. A PDP substrate 10 is used for so-called a.c. PDP substrate, but is also applied to a d.c. PDP substrate. The PDP substrate 10 is equipped with transparent glass flat panels which are facing each other at a distance, i.e. a back panel 12 and a front panel 14. The back panel 12 and front panel 14 are preferably made of easily available soda-lime glass. Between the back panel 12 and front panel 14, a plurality of ribs 16 having a predetermined size are provided to partition the space between them, thereby making it possible to form a plurality of discharge display cells 18. In each discharge display cell 18, an address electrode 20 is provided on the back panel 12 along the rib 16. On the front panel 14, a transparent bus electrode 22 made of an indium tin oxide (ITO) is provided vertically to the rib 16. In addition, a discharge gas such as neon, helium, xenone or the like is contained between the address electrode 20 and bus electrode 22, thereby making it possible to emit light by discharge. On the back panel 12 and address electrode 20, a dielectric layer 21 made as described above is provided. On each address electrode 20, a fluorescent layer 24 is provided in a predetermined order, thereby making it possible to perform color display. Also on the front panel 14 and bus electrode 22, a transparent dielectric layer 26 is provided, if necessary. The address electrode 20 and bus electrode 22 are coated with the dielectric layers 21 and 26, thereby making it possible to prolong lifetime of PDP by inhibition of sputtering of the address electrode 20 and bus electrode 22.

EXAMPLES

The present invention will now be described in detail with reference to the examples. The following examples are not construed as limiting in any way the present invention.

As a raw material for mold, a curable resin solution prepared by containing 1 wt % of Darocure 1173 (2-hydroxy-2-methyl-1-phenyl-propan-1-one) manufactured by Ciba-Gigy Co. as a initiator in Photomer 6010 (aliphatic urethane acrylate oligomer) manufactured by Henkel Co. was used. This solution was cured by irradiation with UV having a wavelength of 200 to 450 nm for 30 seconds, using a UV light source manufactured by Ushio Co., Ltd. to make a mold.

A black photosensitive glass-ceramic paste was prepared by mixing a mixture of 10 g of a bisphenol A glycidyl ether methacrylic acid adduct (manufactured by Kyoeisha Chemical Co., Ltd.) and 10 g of triethylene glycol dimethacrylate (manufactured by Wako Pure Chemical Industries, Ltd.) as a curable resin, 20 g of 1,3-butanediol (manufactured by Wako Pure Chemical Industries, Ltd.) and 10 g of acetone (manufactured by Wako Pure Chemical Industries, Ltd.) as a diluent, 0.1 g of Irgacure 819 [bis(2,4,6-trimethylbenzoyl)phenylphosphine oxide, manufactured by Ciba-Gigy Co.] as a curing initiator, 0.2 g of so-called POCA (phosphate propoxylalkyl polyol) as a surfactant, and 150 g of a mixed powder of lead glass and ceramic (PFB-030, manufactured by Asahi Glass Co., Ltd.) as a solid.

A white photosensitive glass-ceramic paste was prepared by mixing a mixture of 10 g of a bisphenol A glycidyl ether methacrylic acid adduct (manufactured by Kyoeisha Chemical Co., Ltd.) and 10 g of triethylene glycol dimethacrylate (manufactured by Wako Pure Chemical Industries, Ltd.) as a curable resin, 20 g of 1,3-butanediol (manufactured by Wako Pure Chemical Industries, Ltd.) as a diluent, 0.1 g of Irgacure 819 [bis(2,4,6-trimethylbenzoyl)-phenylphosphine oxide, manufactured by Ciba-Gigy Co.] as a curing initiator, 0.2 g of so-called POCA (phosphate propoxylalkyl polyol) as a surfactant, and 150 g of a mixed powder of lead glass and ceramic (PFB-030, manufactured by Asahi Glass Co., Ltd.) as a solid.

The groove portion of the mold was partially filled with the black photosensitive glass-ceramic paste. On filling, a soft paper was used to wipe off excess paste. The mold filled with the black paste was cured by irradiated with light having a wavelength of 400 to 500 nm (fluorescent lamp manufactured by Philip Co.) for one minute. The white photosensitive glass-ceramic paste was coated on a glass base, and then the mold filled with the cured black paste and glass base were laminated with each other. The resulting laminate was irradiated with light having a wavelength of 400 to 500 nm (fluorescent lamp manufactured by Philip Co.) for three minutes. Finally, the mold was removed from the glass base, thus making it possible to form a rib precursor molded article composed of a black upper portion and a white lower portion on the glass base. Furthermore, the rib precursor molded article was sintering with heating to 550° C., thus making it possible to form a rib composed of a black upper portion and a white lower portion.

Comparative Example

The same mold for rib and glass-ceramic pastes as those in the example were used. In the same manner as in the example, a mold was filled with a black paste. After the mold with the paste was allowed to stand at room temperature for 15 minutes, a white paste was coated on a glass base, and then the mold and glass base were laminated with each other. After the resulting laminate was irradiated with light having a wavelength of 400 to 500 nm for three minutes, the mold was removed from the glass base. In this case, the black paste was mixed with the white paste, thus making it impossible to form a rib composed of a black upper portion and a white lower portion on the glass base.

We claim:

1. A method of producing a rib for a plasma display panel substrate, which comprises the steps of:
    (a) partially filling a groove portion of a mold with a first photosensitive glass-ceramic paste selected from a photosensitive black glass-ceramic paste and a photosensitive white glass-ceramic paste, and curing the paste by irradiating with radiation;
    (b) supplying a second photosensitive glass-ceramic paste, which is different from the first photosensitive glass-ceramic paste, selected from the photosensitive black glass-ceramic paste and the photosensitive white glass-ceramic paste, on a glass base, and laminating the mold with the glass base through the second paste to form a laminate;
    (c) irradiating the laminate with radiation to form a rib precursor molded article composed of two white and black layers;
    (d) removing the mold from the glass base and the rib precursor molded article to transfer the rib precursor molded article to the glass base; and
    (e) sintering the rib precursor molded article to form a rib formed integrally on the glass base.

2. The method of claim 1, wherein the glass base is a back panel, and the photosensitive paste in the step (a) is a photosensitive black glass-ceramic paste and the photosensitive paste in the step (b) is a photosensitive white glass-ceramic paste.

3. The method of claim 1, wherein the mold is pliable.

4. The method of claim 1, wherein the mold is transparent and the irradiation with radiation in the step (c) is conducted from both of the mold side and the glass base side of the laminate.

5. The method of claim 1, wherein the photosensitive black glass-ceramic paste and the photosensitive white glass-ceramic paste contain a glass component, a ceramic component and a binder component.

6. The method of claim 5, wherein the photosensitive black glass-ceramic paste contains a white component selected from the group consisting of alumina, titania and low-melting glass filler and the photosensitive white glass-ceramic paste contains a black component selected from the group consisting of metal oxides of Ru, Mn, Ni, Cr, Fe, Co and Cu.

7. The method of claim 5, wherein the binder component is selected from the group consisting of bisphenol A diglycidyl ether (meth)acrylic acid adduct, Epolite 1600 acrylic acid adduct, Epolite 3002 acrylic acid adduct, ethylene glycol dimethacrylate, diethylene glycol dimethacrylate, triethylene glycol dimethacrylate and a mixture thereof.

8. The method of claim 5, wherein the binder component is a silane coupling agent having a (meth)acrylic group.

9. The method of claim 1, wherein the photosensitive black glass-ceramic paste and the photosensitive white glass-ceramic paste further contain an oxidizing catalyst.

10. The method of claim 9, wherein the oxidizing catalyst is selected from the group consisting of oxides, salts and complexes of chromium (Cr), manganese (Mn), iron (Fe), cobalt (Co), nickel (Ni), copper (Cu), zinc (Zn), indium (In), tin (Sn), ruthenium (Ru), rhodium (Rh), palladium (Pd), silver (Ag), iridium (Ir), platinum (Pt), gold (Au) and cerium (Ce).

* * * * *